W. R. TENNILLE.
VEHICLE BODY MOUNTING.
APPLICATION FILED AUG. 20, 1914.
1,155,528.
Patented Oct. 5, 1915.
2 SHEETS—SHEET 2.
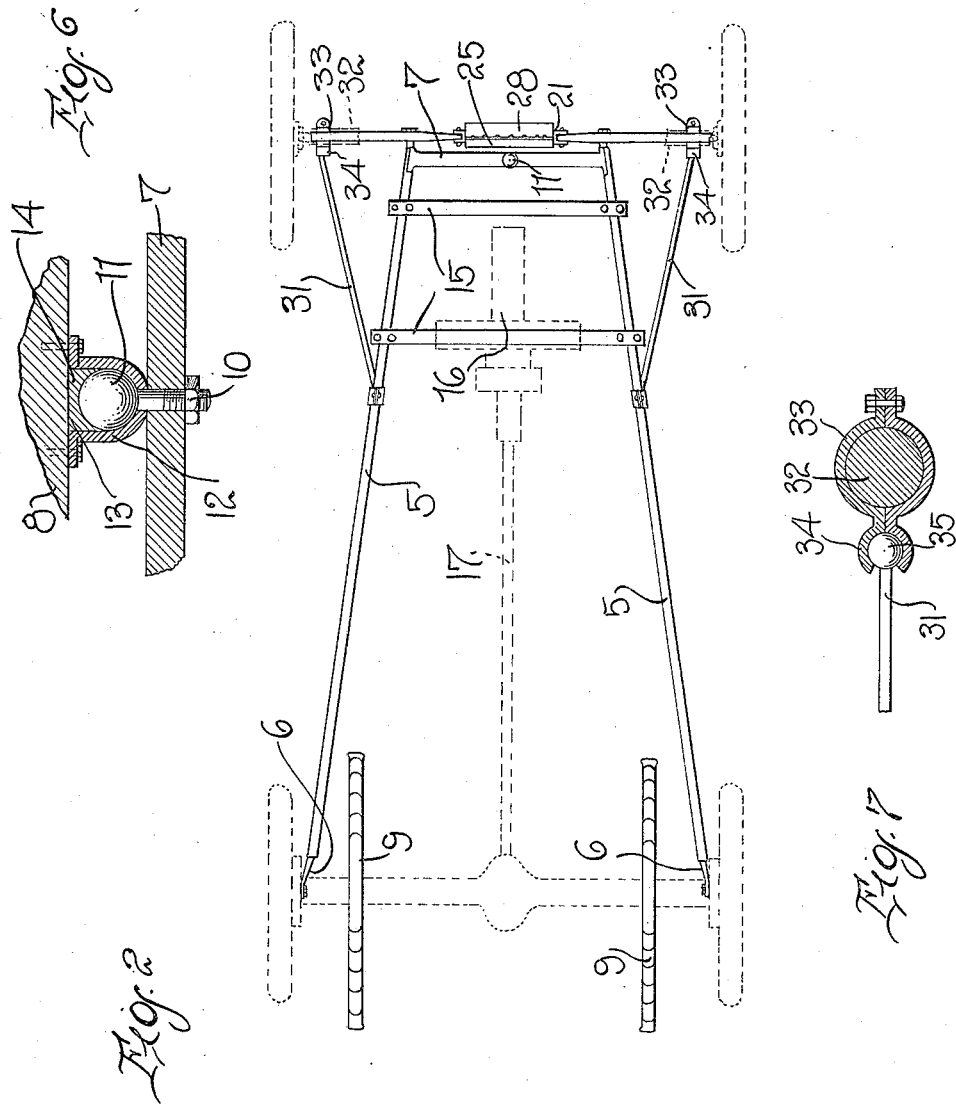
Witnesses
Robert M. Sutphen
A. L. Hind
Inventor
WALTER R. TENNILLE
By Watson E. Coleman
Attorney

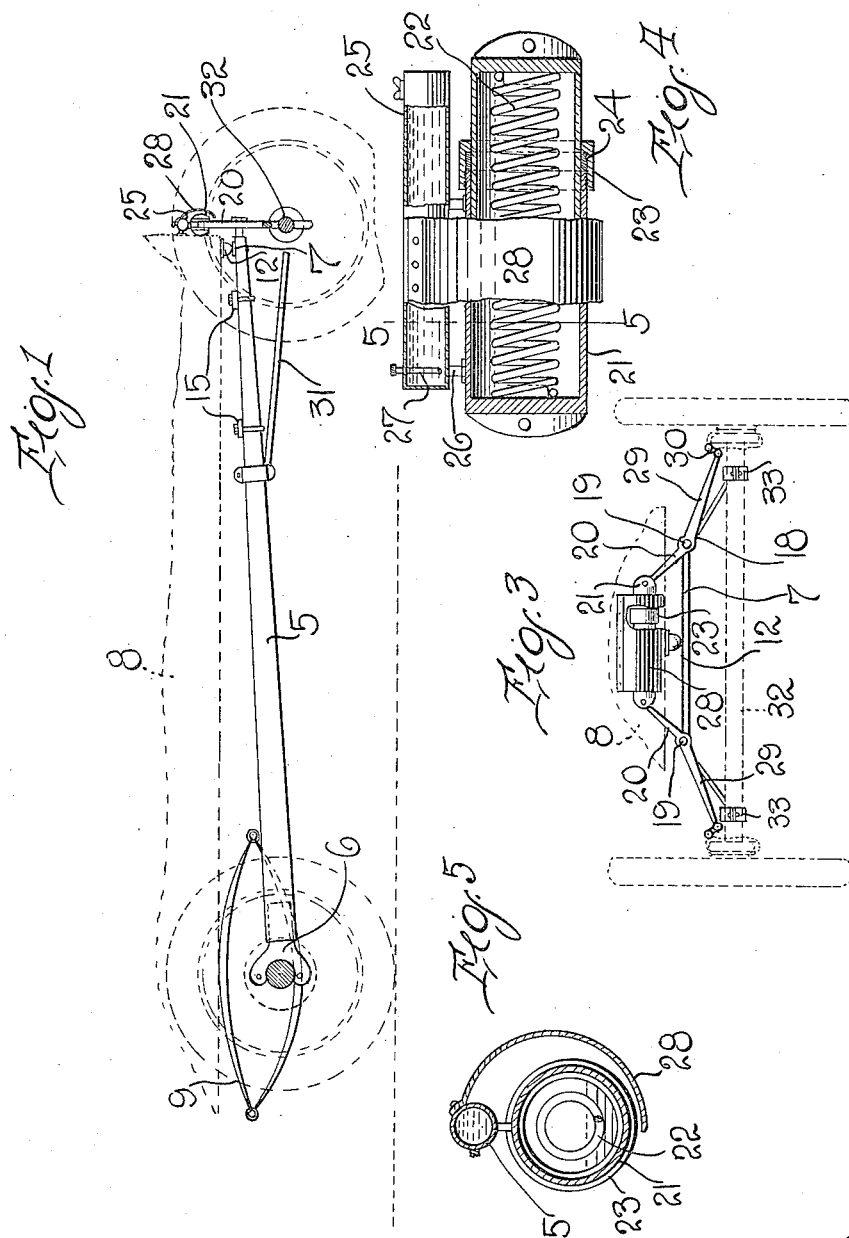

UNITED STATES PATENT OFFICE.

WALTER R. TENNILLE, OF DOTHAN, ALABAMA.

VEHICLE BODY-MOUNTING.

1,155,528.   Specification of Letters Patent.   Patented Oct. 5, 1915.

Application filed August 20, 1914. Serial No. 857,736.

*To all whom it may concern:*

Be it known that I, WALTER R. TENNILLE, a citizen of the United States, residing at Dothan, in the county of Houston and State of Alabama, have invented certain new and useful Improvements in Vehicle Body-Mountings, of which the following is a specification, reference being had to the accompanying drawings.

This invention relates to an improved vehicle body mounting and, generally stated, has for its primary object to provide an effective means for reducing to a minimum, undue strains upon the vehicle frame, or the body which is mounted thereon.

The invention has for a more particular object to provide improved means for mounting the vehicle body upon the forward axle of the machine, whereby all shocks and jars incident to travel over road surfaces, are absorbed.

With the above and other objects in view, my invention consists in the novel construction, combination, and arrangement of parts to be hereinafter more fully described, claimed, and illustrated in the accompanying drawings, in which, Figure 1 is a side elevation of the chassis of a motor vehicle illustrating my improved body mounting. Fig. 2 is a top plan view; Fig. 3 is a front end elevation; Fig. 4 is an enlarged section of the shock absorbing device: Fig. 5 is a section taken on the line 5—5 of Fig. 4; Fig. 6 is an enlarged detail section illustrating the manner of mounting the forward end of the vehicle body; and Fig. 7 is a similar view showing the connection between the truss rods and the vehicle axle.

Referring in detail to the drawings, 5 indicates the longitudinal side bars of the frame or chassis of the machine. The rear ends of these side bars are secured to the forwardly projecting arms 6 which are fixed to the ends of the rear axle casing. The bars 5 converge from their rear to their forward ends as clearly shown in Fig. 2 and at their latter ends, the bars are connected by a transverse bar 7. 8 indicates the vehicle body, the rear end of which is suitably mounted upon the rear elliptical suspension springs 9. In the center of the transverse bar 7, a bolt 10 is mounted, said bolt being formed upon its upper end with a spherical terminal or head 11. This spherical head on the bolt 10 is engaged in a bearing cup 12 which is fixed to the under side of the vehicle body 8 at its forward end. A plate 13 provided with a concave seating face 14 is arranged in the cup 12 between the upper surface of the head 11 and the bottom of the vehicle body.

As illustrated, the bars 5 are connected adjacent their forward ends by the parallel transverse bars 15 upon which the engine, indicated at 16, is mounted. The transmission shaft 17 extends from the engine centrally between the side bars of the chassis or frame of the vehicle and is geared directly to the differential of the rear driving shaft. The forward ends of the bars 5 are provided with cylindrical threaded terminals which are loosely engaged in openings provided in the levers 18, as indicated at 19. The shorter arms 20 of the levers 18 extend inwardly and upwardly and are pivotally connected to the outer ends of the relatively movable telescopically engaged cylinder sections 21. A coil spring 22 is arranged within the cylinder sections and bears at its ends against the outer closed ends of said sections. Upon the other end of the outer cylinder section, a sleeve 23 is threaded in which a packing gland or washer 24 is arranged. Thus, a fluid tight connection between the two sections of the cylinder is provided. 25 designates an oil reservoir which is connected by the pipes or tubes 26 to the interior of the cylinder, and suitable valves 27 are provided whereby the flow of the oil from the reservoir into the cylinder may be properly controlled and regulated. 28 designates a shield plate which is secured to the reservoir 25 and extends forwardly around the cylinder to protect the latter against accumulations of mud and other foreign matter.

The longer arms 29 of the levers 18 extend outwardly and downwardly from the fulcrums 19 of the levers and at an obtuse angle with respect to the shorter arms 21. The outer ends of said longer arms are connected to the wheel knuckles by means of short links 30. It is apparent, that by means of this arrangement, when the machine is traveling over a rough or uneven grade surface, the forward wheel axle may freely move in a vertical plane with relation to the chassis or body of the vehicle, and in such movement, the levers 18 rock upon the forward ends of the bars 5, the telescoping cylinder sections 21 alternately moving inwardly and outwardly, the spring 22 being compressed in the inward movement thereof and the oil or other fluid expelled through the connecting tubes 26 into the reservoir 25. In the outward movement of the cylinder sections, the oil flows back into the cylinder. Thus a fluid cushion is provided in addition to the shock absorbing spring 22 whereby vibration of the vehicle body and undue strain to the supporting frame or chassis is obviated.

Obliquely extending brace or truss rods 31 connect the side bars 5 of the frame to the outer ends of the front wheel axle 32. These truss rods relieve the frame of strain incident to longitudinal thrust, but permit of a free vertical movement of the frame with respect to the wheel axle. The mounting or connection of said truss rods to the frame and axle of the vehicle is identical and consists of a sectional sleeve or collar 33, the collar sections being provided with socket members 34 to receive the spherical terminals or balls 35 which are formed upon the ends of the truss rods 31.

From the foregoing description, taken in connection with the accompanying drawings, the construction, manner of operation and several advantages of my improved vehicle body mounting will be clearly and fully understood.

The improved manner of suspending the forward vehicle axle from the frame effectually relieves the frame and body of undue vibration.

My improved shock absorber is also extremely simple in its construction, highly efficient and reliable in practical operation, and capable of manufacture at relatively small cost.

While I have shown and described the preferred construction and arrangement of the several elements employed, it will be understood that the invention is susceptible of considerable modification therein, and I therefore reserve the privilege of resorting to all such legitimate changes as may be fairly embodied within the spirit and scope of the appended claims.

What is claimed is:—

1. The combination with a vehicle frame and supporting axle therefor, of levers fulcrumed intermediate of their ends upon said frame and having short inwardly and upwardly extending arms and relatively long outwardly extending arms, link connections able sections between the latter ends of the arms and the axle, and relatively movable spring held members to which the shorter arms of the respective levers are connected.

2. The combination with a vehicle frame and supporting axle therefor, of levers fulcrumed intermediate of their ends upon the frame and having short inwardly and upwardly extending arms and relatively long outwardly extending arms, link connections between the latter arms of the levers and the axle, and spring held telescopically engaged members, the ends of the shorter arms of the respective levers being pivotally connected to said members.

3. The combination with a vehicle frame including longitudinal side bars, a front supporting axle for said frame, of levers fulcrumed intermediate of their ends upon the forward ends of said frame bars, shock absorbing means including telescoping cylinder sections, the inner ends of said levers being pivotally connected to the respective cylinder sections, and relatively movable means connecting the outer ends of said levers to the ends of the vehicle axle.

4. The combination with a vehicle frame including longitudinal side bars and a front axle to support said frame, of levers fulcrumed intermediate of their ends upon the respective frame bars, telescopically engaged cylinder sections, the inner ends of said levers being pivotally connected to the respective cylinder sections, a spring arranged within said sections and normally tending to force the same apart, and links connecting the outer ends of the respective levers to the ends of the vehicle axle.

5. The combination with a vehicle frame including longitudinal side bars and a front axle to support said frame, of levers fulcrumed intermediate of their ends upon the respective frame bars, spring held telescopically engaged cylinder sections, the inner ends of said levers extending upwardly from their fulcrums and pivotally connected to the respective cylinder sections, the outer ends of said levers extending downwardly from their fulcrums, and links connecting the outer ends of the respective levers to the ends of the vehicle axle.

6. The combination with a vehicle frame including longitudinal side bars and a front supporting axle for said frame, of levers fulcrumed intermediate of their ends upon said frame bars, telescopically engaged cylinder sections, a coil spring arranged within said sections and normally tending to force the same apart, an oil reservoir in communication with the interior of the cylinder, each of said levers having an inwardly and upwardly extending arm pivotally connected to one of the cylinder sections and a relatively long outwardly and downwardly extending arm, and links connecting the latter arms of the respective levers to the ends of the vehicle axle.

In testimony whereof I hereunto affix my signature in the presence of two witnesses.

WALTER R. TENNILLE.

Witnesses:
 M. CARLISLE LYDDANE,
 D. W. GALL.

Copies of this patent may be obtained for five cents each, by addressing the "Commissioner of Patents, Washington, D. C."